United States Patent
Oldham et al.

(10) Patent No.: US 6,305,653 B1
(45) Date of Patent: *Oct. 23, 2001

(54) PORTABLE TRIPOD SUPPORT FOR PORTABLE KEYBOARD DEVICE

(76) Inventors: A. Evert Oldham, 43 Rd., 3523, Flora Vista, NM (US) 87415; Drexel L. Pruitt, 1514 Santiago, Farmington, NM (US) 87401

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,610

(22) Filed: Oct. 15, 1997

(51) Int. Cl.[7] .................................................... F16M 11/02
(52) U.S. Cl. .................. 248/177.1; 248/463; 248/125.8; 248/917; 248/170; 403/348; 403/350; 243/163.2; 243/432
(58) Field of Search ................................ 248/177.1, 463, 248/125.8, 166, 167, 434, 169, 170, 171, 439, 917, 922, 186.2, 176.1, 222.42; 243/163.2, 432, 178.1; 403/348, 350, 102, 117, 174, 217

(56) References Cited

U.S. PATENT DOCUMENTS

| | | | |
|---|---|---|---|
| 256,540 | * 4/1882 | Browne | 248/161 |
| 588,552 | * 8/1897 | Brownell | 248/161 |
| 873,121 | * 12/1907 | Flory | 248/161 |
| 1,239,136 | * 9/1917 | Stone | 248/161 |
| 1,759,165 | * 5/1930 | Mayer | 248/161 |
| 2,794,612 | * 6/1957 | Clifton | 248/161 |
| 3,745,937 | * 7/1973 | Gail | 108/128 |
| 4,398,815 | * 8/1983 | Barzee et al. | 354/293 |
| 4,648,697 | * 3/1987 | Kawazoe | 354/293 |
| 5,222,708 | * 6/1993 | McLellan | 248/345.1 |
| 5,362,025 | * 11/1994 | Trom et al. | 248/670 |
| 5,384,614 | * 1/1995 | Hasuda | 354/286 |
| 5,462,247 | * 10/1995 | Aldrich | 248/118 |
| 5,503,357 | * 4/1996 | Johnson et al. | 248/188.5 |
| 5,513,829 | * 5/1996 | Hodges | 248/670 |
| 5,927,669 | * 7/1999 | Sassman | 248/346.01 |

* cited by examiner

*Primary Examiner*—Leslie A. Braun
*Assistant Examiner*—Kimberly Wood
(74) *Attorney, Agent, or Firm*—Maxwell C. Freudenberg; Kenton L. Freudenberg (57) ABSTRACT

A portable tripod support beneath a portable notebook computer for a seated computer user. The support comprises a platform with spider-like foldable support arms having relatively folded parallel and unfolded flat coplanar positions. Fasteners on the ends of the unfolded arms are releasably secured to the computer near its corners. The platform is releasably connected to a head of an adjustable-height folding tripod with the platform plane tipped toward the user for optimum access to the computer's keyboard. One tripod leg is pointed toward the user to minimize interference between the tripod legs and the users feet when the support is positioned in front of a user seated as an aircraft passenger. Each tripod leg has an upper main leg member and at least another telescoping member for leg length adjustment. The tripod upper main leg members are pivotably connected to the head and their outward unfolding movement is limited by a foldable three-arm support having outer ends of the arms connected to the lower ends of respective main leg members. The inner ends of three arms are interconnected by a flat yoke member. Upper flat surfaces of the three arms and the yoke member are in a common horizontal plane providing a knee-height platform for user accessories. The arm and yoke member configuration prevents downward yoke movement relative to the platform plane, but permits upward yoke member movement enabling the folded spider arms and tripod legs to all be folded to parallel positions.

26 Claims, 10 Drawing Sheets

PORTABLE TRIPOD SUPPORT FOR PORTABLE KEYBOARD DEVICE

BACKGROUND OF THE INVENTION

Personal computers have evolved to the point where portable "laptop" or "notebook" models are quite common. The present invention allows greater ease of use of such portable computers by providing a compact, readily portable and ergonomically comfortable freestanding support for the computer along with supporting means for external peripheral devices such as disk drives, and for a pointing device, such as a "mouse."

SUMMARY OF THE INVENTION

Portable "laptop" or "notebook" computers, which are in widespread use, are commonly supported on whatever surface may be available including table or desk tops or the users' lap, i.e the tops of the user's legs while the user is in a sitting position. Even assuming a surface to be available, the height of the typical desk top or table top is often not suitable for the most comfortable and convenient use of a keyboard or mouse since a table top or desk top is typically higher than is desirable. Additionally while most such surfaces are level and flat, use of a keyboard may be much more comfortable if it can be tilted slightly toward the user. Supporting such a device on the user's lap for any length of time also means that the user has little ability to change positions or leave a seated position. Also a mouse, commonly used as a pointing device, typically requires a flat surface upon which it may be operated. When a notebook computer is supported on the user's lap there is typically no convenient way of using a mouse, which generally requires a flat open surface area on which it may be moved. Many notebook computers provide a non-movable "trackball" built into or appended to the computer keyboard as an alternative to a mouse, but a mouse is often preferred as an input and pointing device. The present invention allows for attachment of a mousepad support to allow use of a conventional movable mouse.

Figure 1:
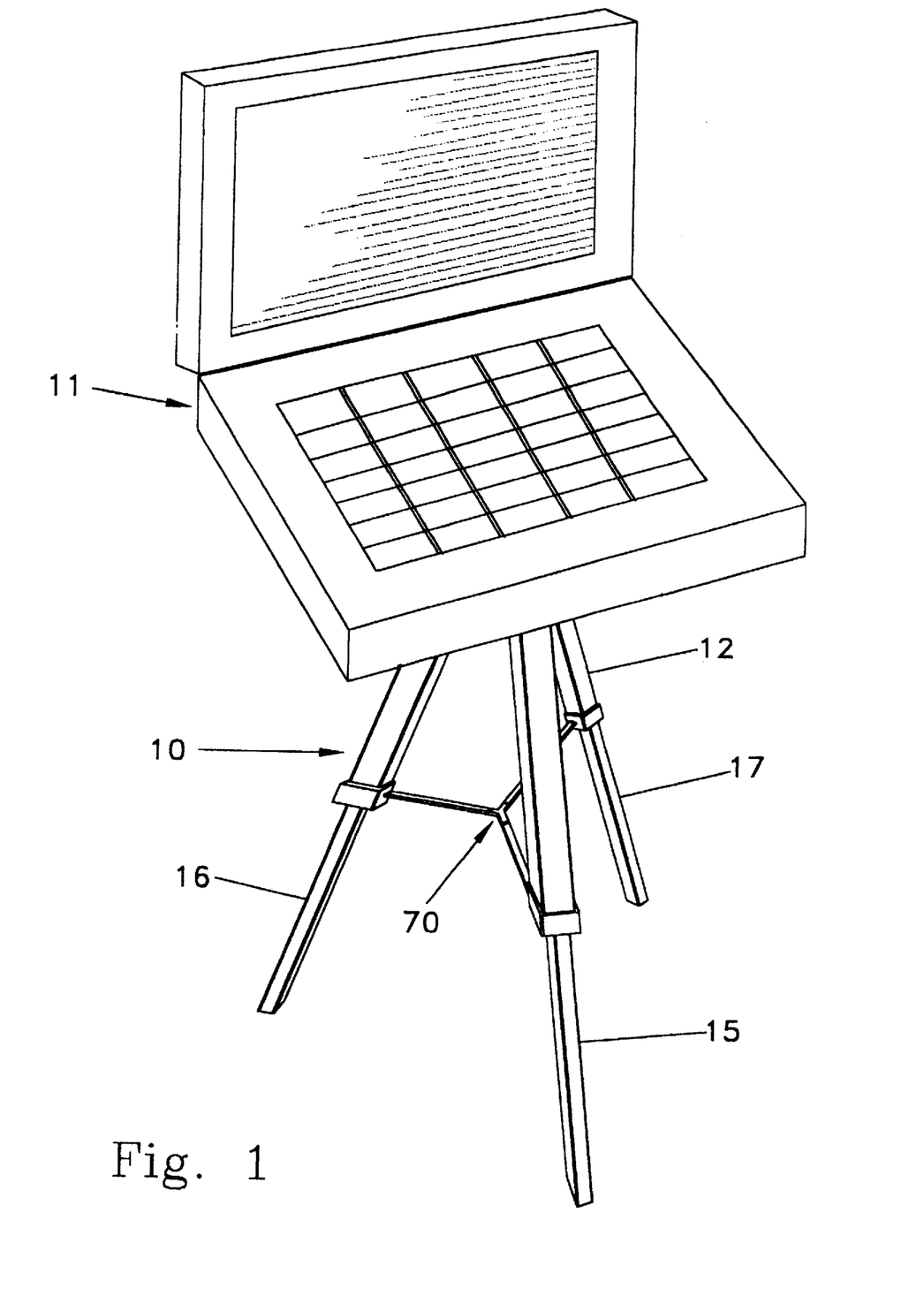
FIG. 1 is a perspective view of the tripod support device of the present invention supporting a notebook computer.
Figure 2:
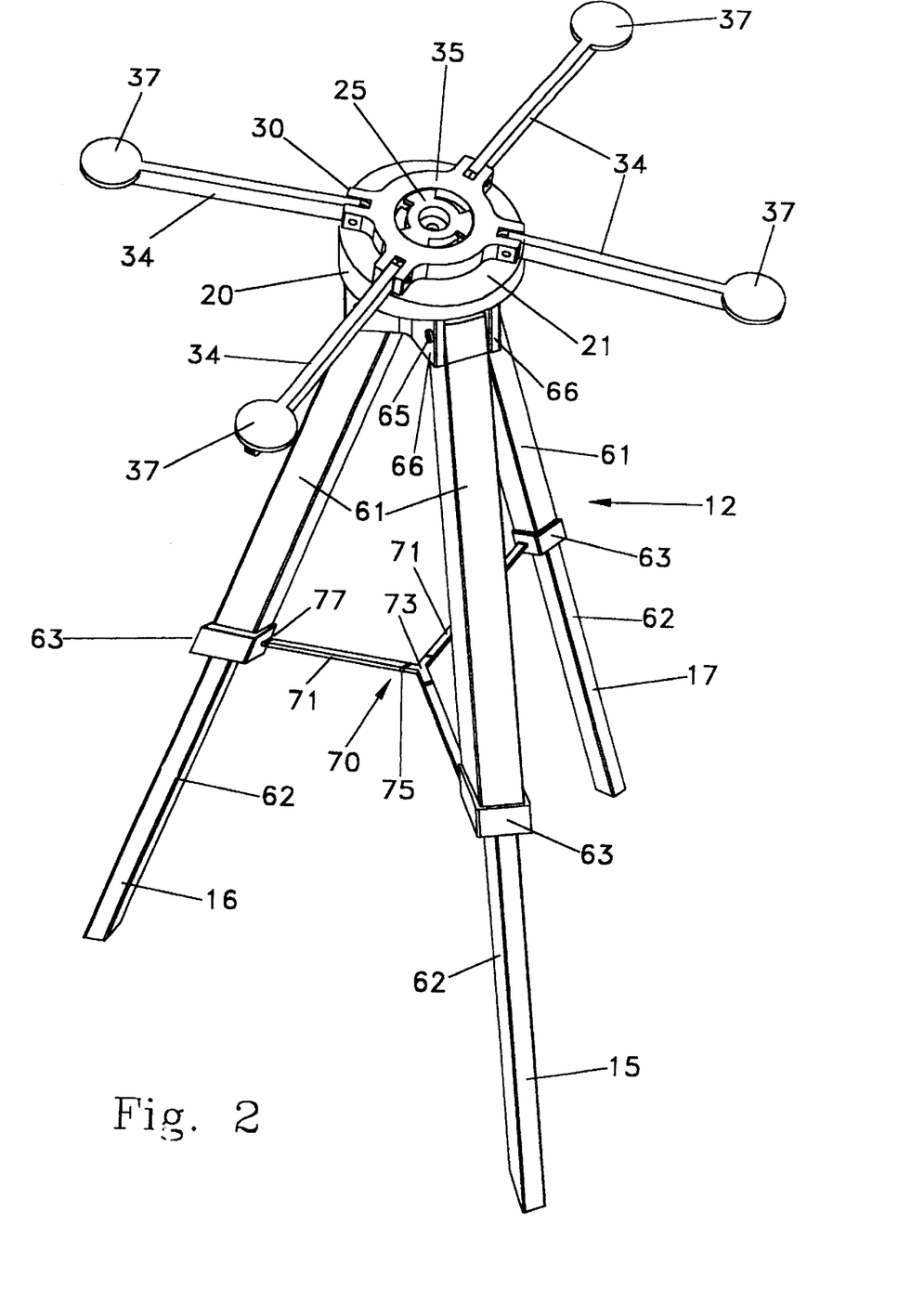
FIG. 2 is a perspective view of the present invention corresponding to FIG. 1 without the notebook computer.
Figure 3:
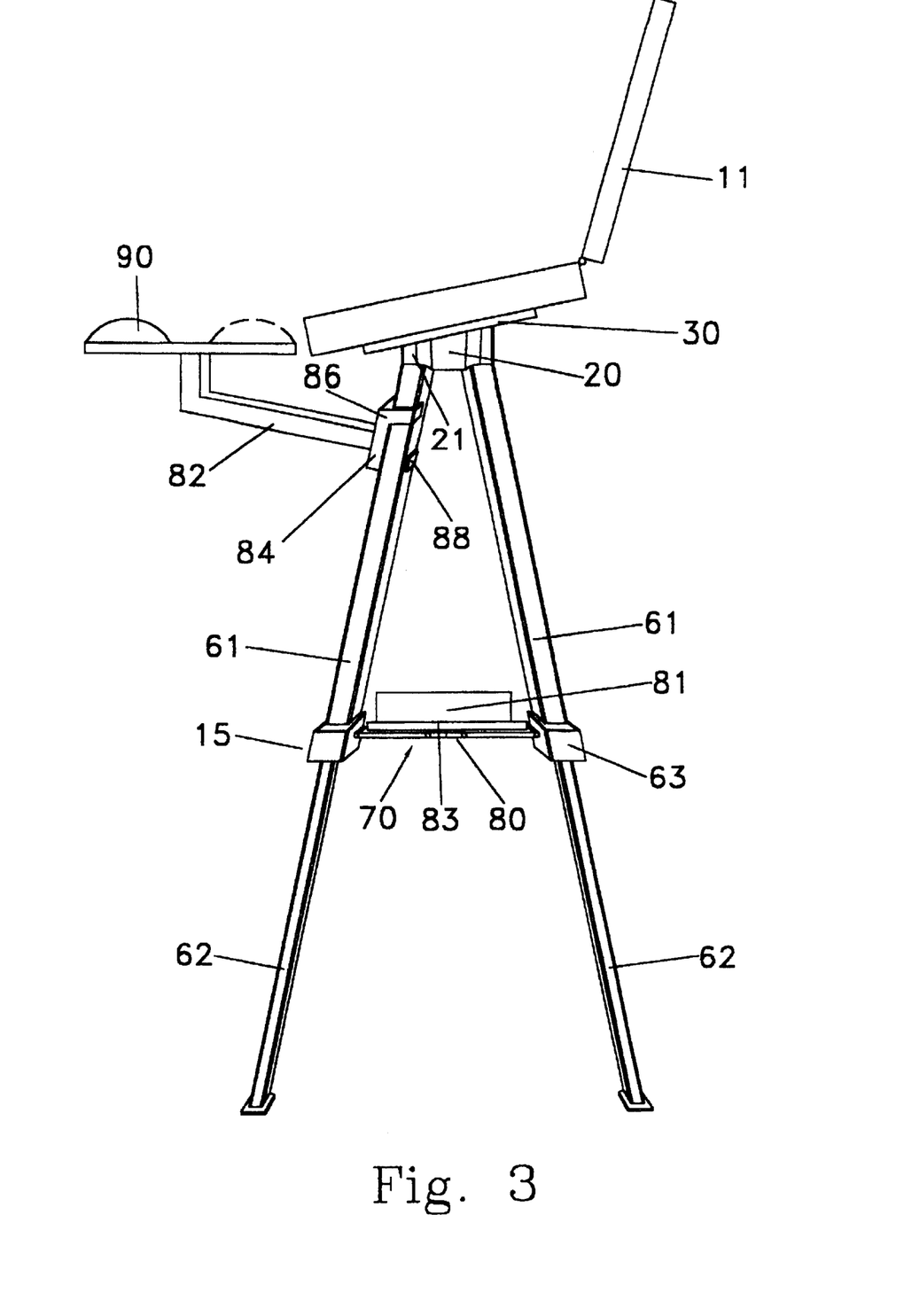
FIG. 3 is a side view of the device of the present invention supporting a notebook computer and further showing a wrist support attached to a leg of the tripod.

The present invention as shown in FIGS. 1–3 comprises a stable detachable tripod support for a notebook computer providing a "footprint" at floor or ground level which is a triangle approximately 17 inches on a side. The area of this footprint is sufficiently large to provide substantial stability for the computer or similar device yet is small enough to allow support and use of the device in a relatively confined space, such as on the floor in front of a seat on a commercial airliner.

In use, the tripod support is typically oriented with a single front leg oriented toward the user so that the users feet straddle that leg thereby minimizing any interference between the user's legs and feet and the legs of the tripod. Each of the tripod legs is adjustable in height to allow the computer to be set to a height which is appropriate and comfortable for the user. The upper surface of the head of the tripod is permanently fixed to tilt or cant the computer toward the user at a fixed angle of approximately 15 degrees from horizontal when all legs are extended to equal lengths. However, the angle of tilt of the computer may be easily adjusted by simply adjusting the front leg to a different height from the rear two legs.

The extended tripod provides a keyboard height of approximately twenty-nine inches, which is approximately the ideal height above the floor for a seated user. The tripod may also be placed upon a table or desktop with the legs partially collapsed to place the keyboard at lectern height for use by a standing user such as might be appropriate when giving a presentation.

The tripod legs are connected at approximately their midpoints by a hinged central yoke assembly which further braces the tripod and fixes the position of the extended tripod legs relative to the central axis of the tripod and to one another. This central yoke further provides a supporting location on the vertical axis of the tripod on which external peripheral devices may be supported.

A collapsible "spider" having four foldable arms provides a platform to support the computer and means for simple and secure attachment of the computer to the tripod. The spider may be left attached to the lower or bottom surface of the computer by means of several areas of hook and loop fastener material which are spaced over the flat underside or back surface of the computer at points to correspond with mating fastener material on the ends of the spider arms. The spider itself is detachably connected to the tripod head by means of a "bayonet" quick-release connector having coaxial mating portions on the spider and on the tripod head. Attachment of the spider, with or without the computer attached, is accomplished by simply engaging the respective mating components and rotating the spider a portion of a turn to lock the spider in place.

The tripod support of the present invention is readily portable, weighing less than 1.25 pounds and being collapsible to a generally cylindrical shape of approximately 15 inches in length by three inches in diameter.

It is an object of the present invention to provide a stable portable freestanding tripod support for a portable computer having a tripod base for stability.

It is an object of the present invention to provide a stable portable freestanding tripod support for a portable computer which provides for adjustability of the height and tilt of the device.

It is an object of the present invention to provide a stable portable freestanding tripod support for a portable computer which is quickly and securely attached to the computer and easily detached from the computer.

It is an object of the present invention to provide a stable portable freestanding tripod support for a portable computer which positions the computer at a comfortable height and orients the computer for the most comfortable use.

It is an object of the present invention to provide a stable portable freestanding tripod support for a portable computer which is adaptable to virtually any computer or similar keyboard device.

It is an object of the present invention to provide a portable freestanding tripod support for a portable keyboard device to allow support and use of the device in relatively confined spaces, such as when the user is seated in a commercial airline seat.

It is an object of the present invention to provide a portable freestanding tripod support for a portable keyboard device which further provides an area below the computer on the central axis of the support for supporting a peripheral device.

It is an object of the present invention to provide a portable freestanding tripod support for a portable keyboard device which further provides for attaching a support for using a mouse or other pointing device.

It is an object of the present invention to provide a foldable head and platform device easily molded from tough, strong, resilient, lightweight and low-cost plastic material for supporting a keyboard device on a tripod.

DETAILED DESCRIPTION OF THE INVENTION

As shown in FIGS. 1–3, the preferred embodiment of the present invention comprises a portable tripod support stand 10 for safely and securely supporting a small generally rectangular light weight keyboard device 11 such as notebook computer, stenotype machine or other compact electronic keyboard device, or accessories therefor. The tripod support stand 10 embodies a tripod 12 having three multi-section telescoping adjustable length legs 15, 16 and 17 interconnected at their upper ends to a strong one-piece molded plastic head 20 having a tilted or canted upper flat surface 21, shown most clearly in FIG. 3, to which is attached an anchor member 25 for removably securing to the head 20 a spider-like support platform 30 shown in FIG. 2 formed by four elongated straight divergent generally coplanar cantilevered independently foldable support arms 34 extending when unfolded from a spider hub member 35 with coplanar outer free ends of the arms 34 carrying at their upper sides round flat integral mini-platforms 37 providing upwardly facing flat coplanar support surfaces for detachable connection to and support of a flat underside or back surface of the keyboard device 11. Inwardly from the mini-platforms 37 toward the hub member 35 the platform 30 is slightly dished relative to the common plane of the mini-platforms 37 by slight upward inclination of the arms 34 as they extend from the hub member 35 whereby most of the support for the keyboard device 11 is provided by the mini-platforms 37 at the outer corners of the device.

The canted surface 21 shown in FIG. 3 slopes downwardly toward front leg 15 and is adapted to be to be positioned by selectively positioning the tripod to orient the front tripod leg 15 toward the user whereby the fixed canted surface 21 is canted toward the user at a fixed angle of about 15 degrees from horizontal when the tripod legs are equally extented and on a horizontal surface and, in combination with height adjustment of the tripod legs 15–17, enables improved ergonomic positioning of the keyboard of the device 11 during use for increased user comfort and reduced user stress and strain.

The anchor member 25 and the spider hub 35 are releasably but tightly secured together by a bayonet-type connection. This bayonet-type connection provides a means for releasably connecting the spider-like support platform 30 to the tripod head 20 and includes means providing a quick-release manual connection by turning the platform 30 a small fraction of a revolution (⅙ revolution or 60°) in opposite directions relative to the head 20 for connection and for release of the platform.

Figure 6:
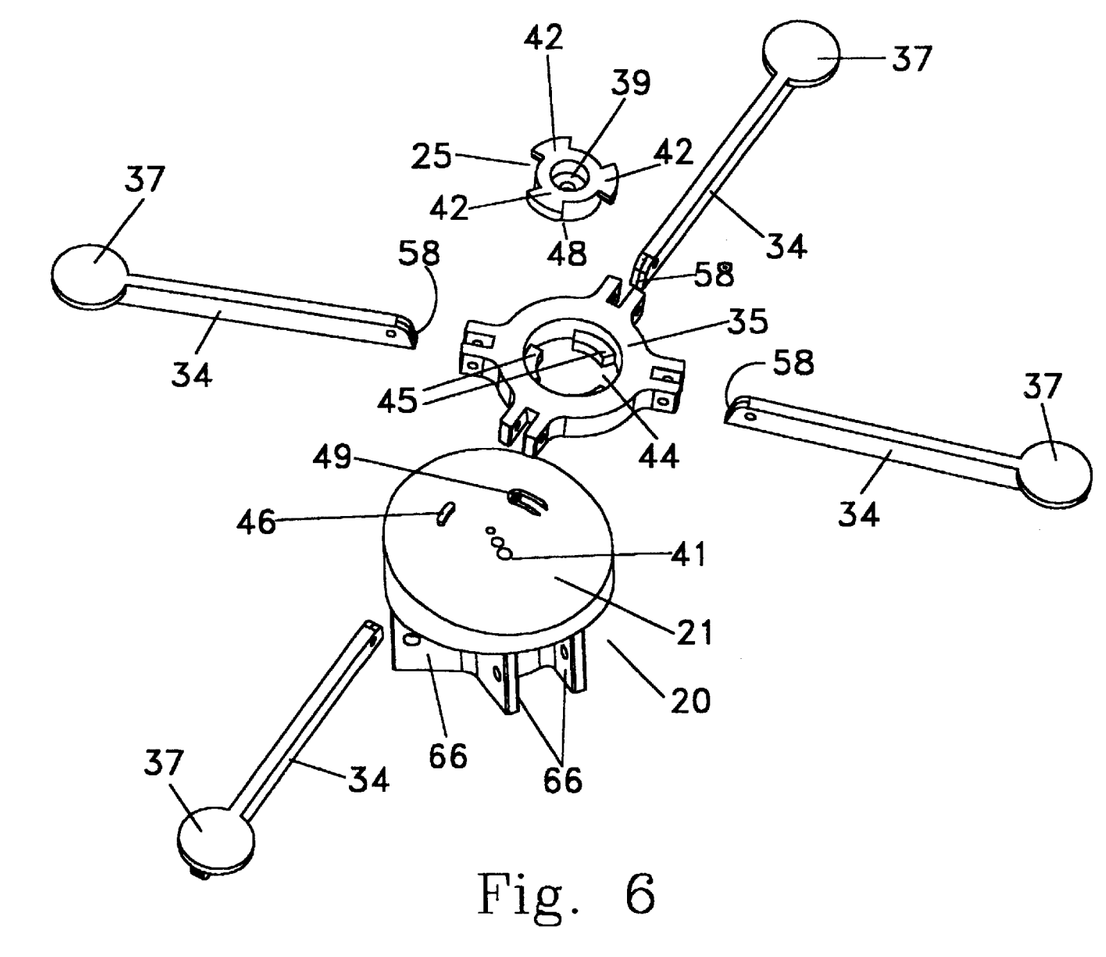
FIG. 6 is an exploded perspective view of the tripod head, spider assembly and arms.
Figure 7:
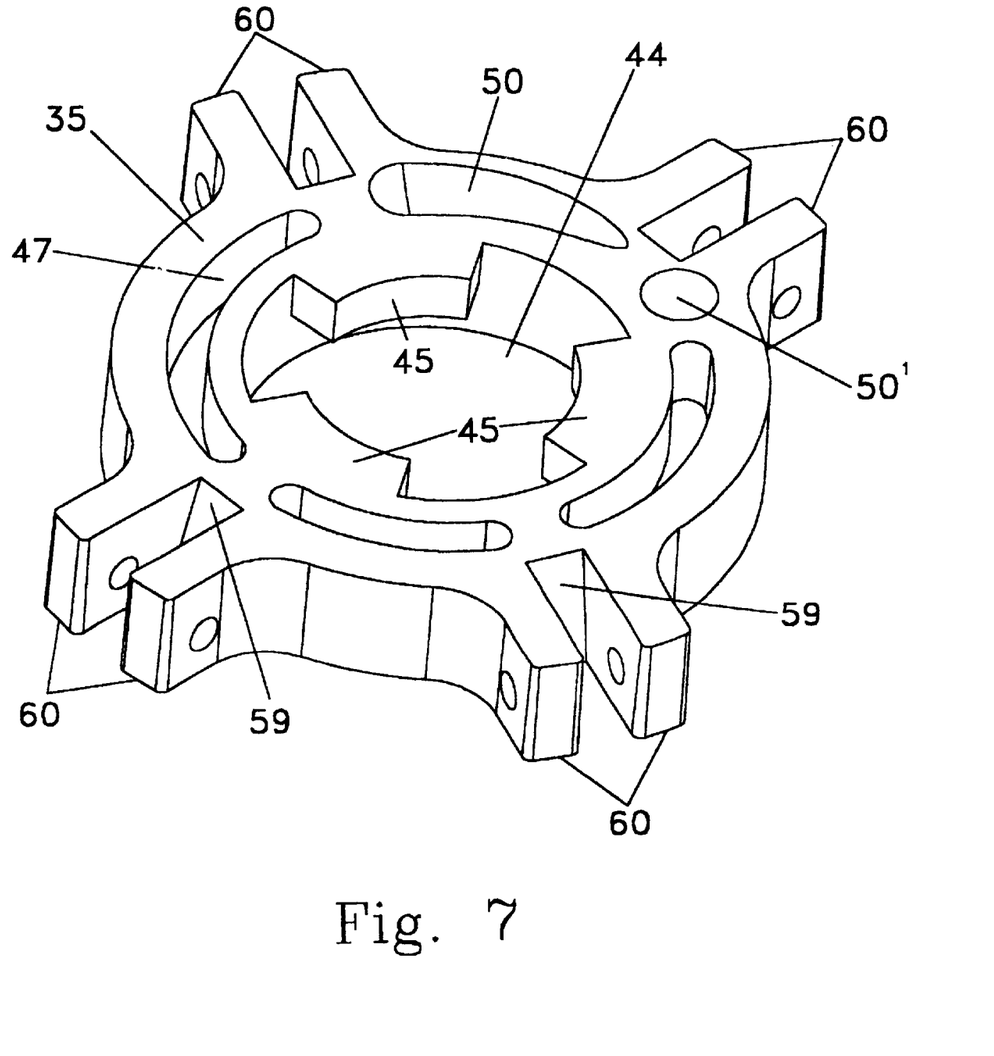
FIG. 7 is a perspective view of the spider hub showing the lower face.
Figure 8:
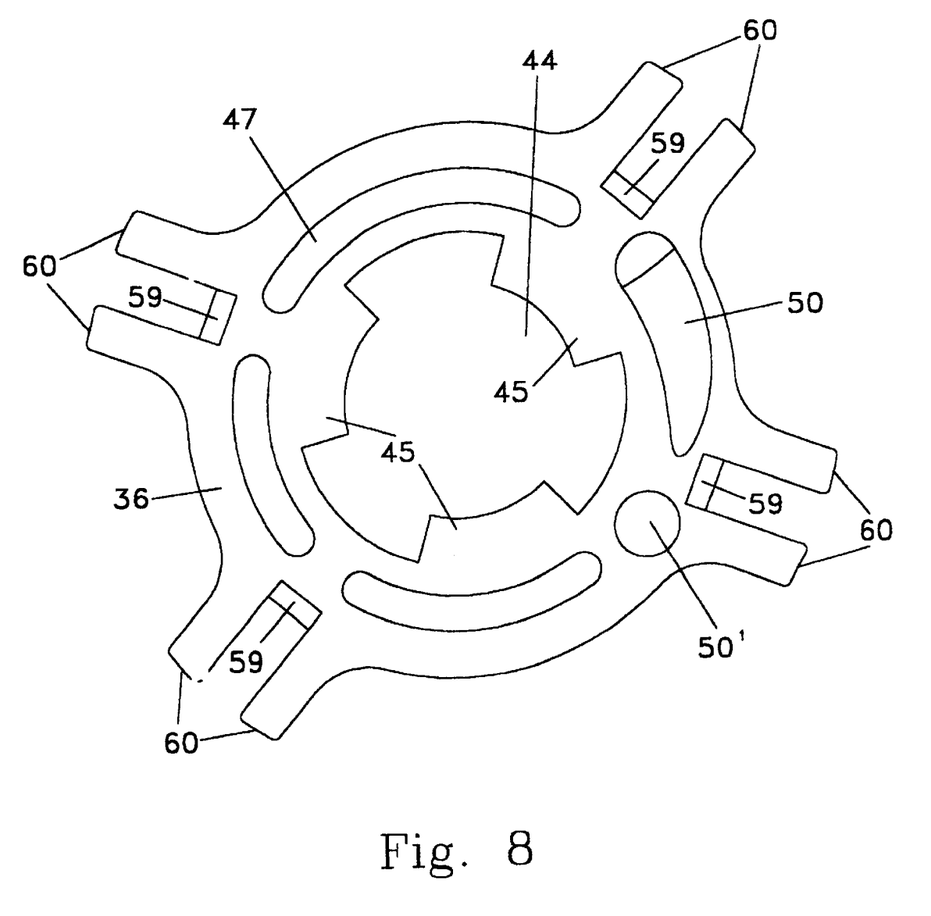
FIG. 8 is a plan view of the lower face of the spider hub.
Figure 9:
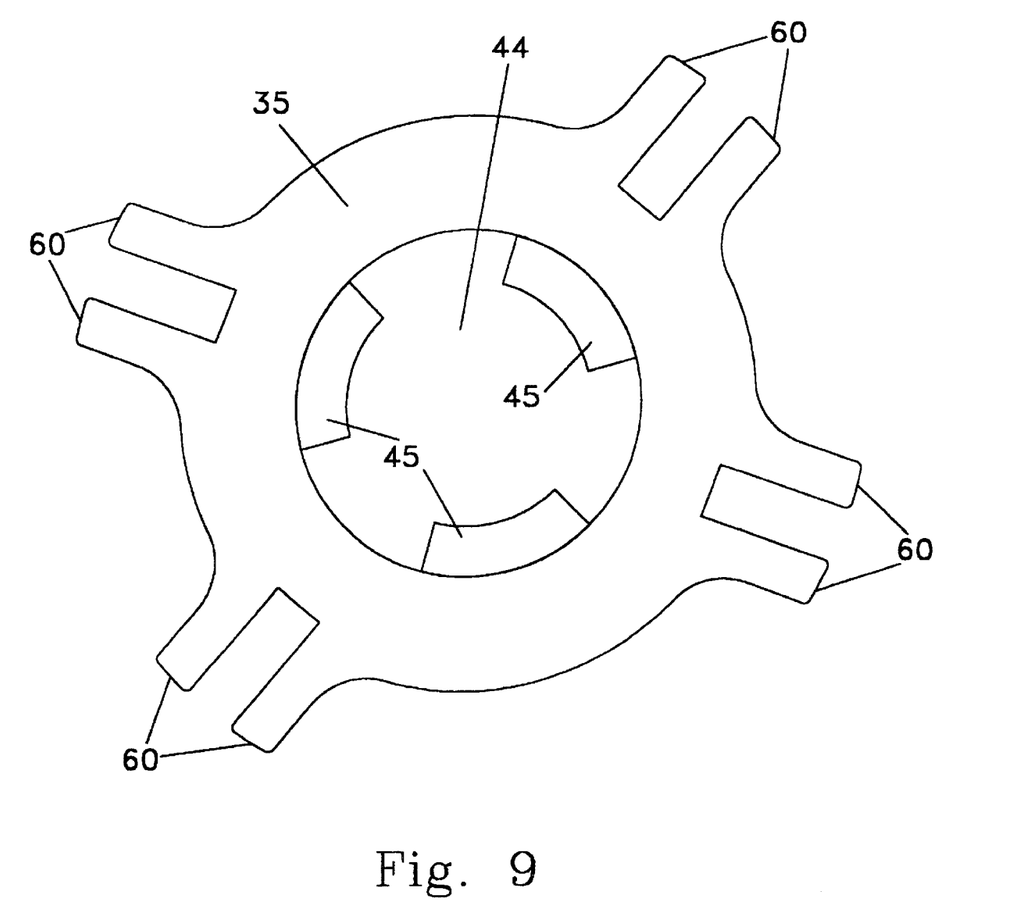
FIG. 9 is a plan view of the upper face of the spider hub.

As shown in the exploded view of FIG. 6, the anchor member 25 has a central cup-shaped portion 39 and is securely fixed against rotation by protuberances on its under face which lock into holes 41 in the canted face 21 of the head 20 to which the anchor member 25 is secured by a center bolt or other suitable fastener extending through the surface 21 and coaxially into a central cylindrical hole in the base of the head 20. Alternatively, the anchor member 25 may be molded as an integral part of head 20. Three segment-shaped portions 42 of the anchor member 25 project outwardly from the cup-shaped portion 39 and have flat bottom faces uniformly spaced from the canted surface 21. The spider hub member 35 has a central opening 44 with inwardly projecting segment-shaped portions 45 complementary in shape to the anchor member segments 42 and of a thickness to fit tightly between the projecting anchor member segments 42 and the canted surface 21. The segments 42 and the segments 45 are all about 60° in their arcuate extent. These spider hub segments 45 enable the spider hub to be secured to the head 20 by orientating the hub segments 45 to move past the anchor member segments 42 until the lower surface of the hub 35 contacts the canted head surface 21 and then manually rotating the hub 35 clockwise not more than 60° to force the hub segments 45 beneath the anchor member segments 42. Clockwise rotation of the hub 35 is limited by engagement of a stop member 46 on the head face 21 with the end of a slot 47 in the bottom face of the hub 35. The hub 35 is retained in this position by engagement of cooperating relatively resiliently biased detent members 49 and 50–50' on the canted surface 21 and the hub 35, respectively. As the hub is rotated into position, the resilient member 49 slides in the groove 50 until it becomes releasably engaged in the hole 50'. The lower corners of the anchor member segments 42 are rounded at 48 to facilitate initial movement of the corners of the hub segments 45 under the anchor member segments 42.

Each support arm 34 is a strong slightly-resilient cantilevered beam member of uniform cross section throughout most of its approximately 4.875 inch length with a height of about 0.4 inches and a width of about 0.2 inches. When unfolded outwardly during use, each support arm 34 has at the top surface of its outer free end the round mini-platform 37 providing an enlarged flat area to which is adhered the hook portion 51 of a hook-and-loop fastener. The mating and relatively soft loop portion 52 of the fastener is adhered to the flat underside surface of the keyboard device at a respective corner thereof. Similar hook members 55 on the upper surface of the hub 35 may be provided for connection to loop members near the bottom center of the keyboard device. Attachment of the spider-like platform 30 to the tripod head 20, and removal therefrom, may be manually achieved while the keyboard device 11 remains attached to the platform 30.

Figure 4:
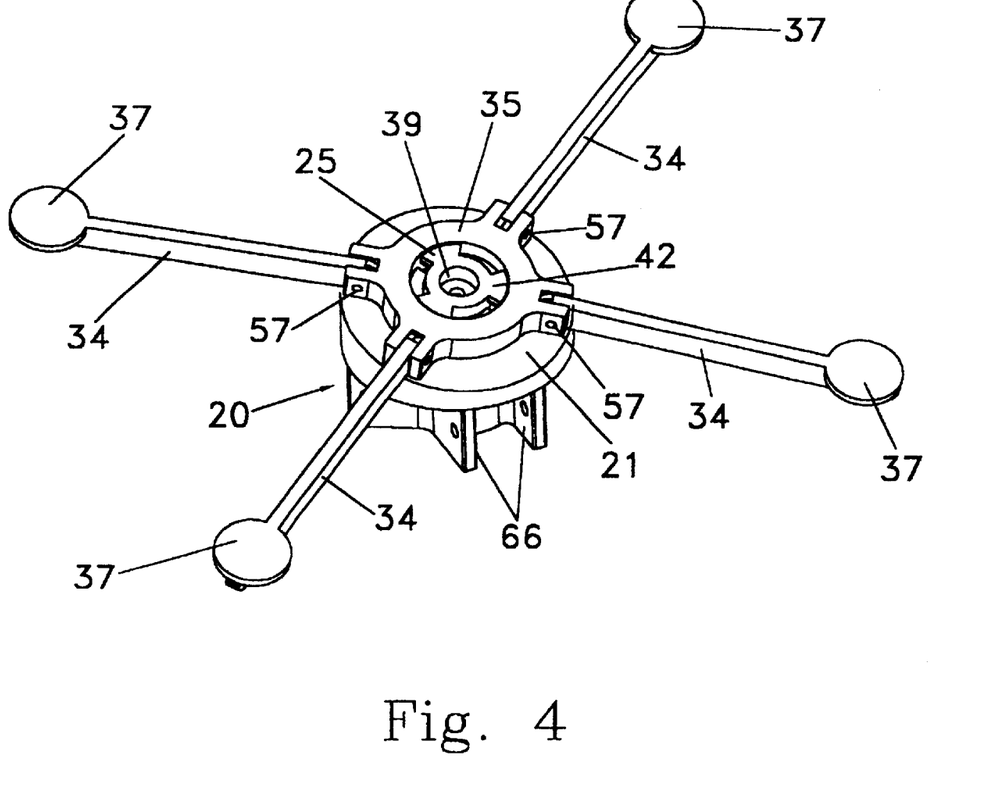
FIG. 4 is a perspective view of the tripod head and spider assembly with arms extended.
Figure 4A:
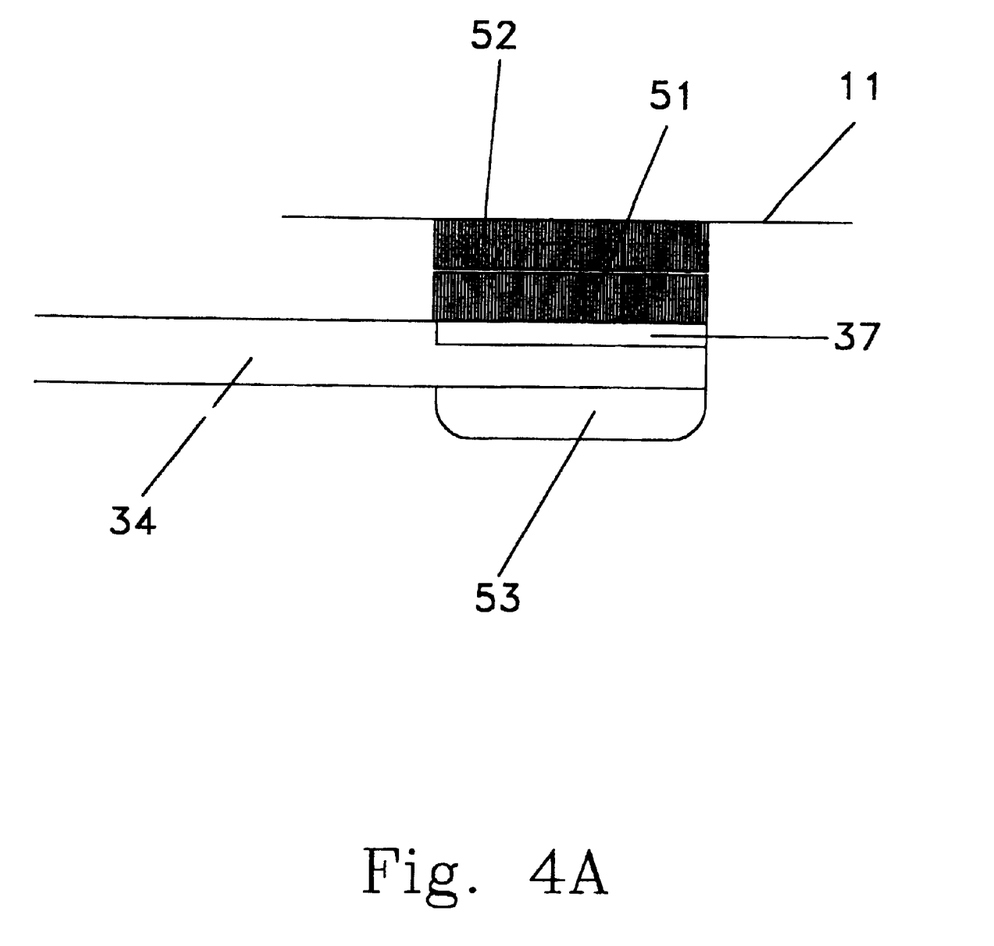
FIG. 4A is a side view showing detail of the end of a spider arm in position secured to the lower surface of a keyboard device.

To facilitate use of the keyboard device on a tabletop with the spider assembly in place but without the using the tripod, non-marring and non-skid feet 53 may be adhered to the bottom of the end of each arm opposite the platforms 37 and the hook fastener portions 51 as shown in FIG. 4A. Because of the extremely small thickness of the platform 30 relative to the thickness of a typical notebook computer keyboard device, i.e. about one half inch, it is practical to keep the platform attached to the bottom of the keyboard device 11 when it is transported in a carrier such as a briefcase. The small dimensions of the arms 34 allow relatively free air flow at the under side of the keyboard device and minimize interference with heat dissipation thereat. When the keyboard device 11 is kept attached to the platform 30 upon their removal from the tripod 12, the platform 30 provides increased ventilation space under the keyboard device when it is placed for use on any flat desk or other flat surface.

Figure 5:
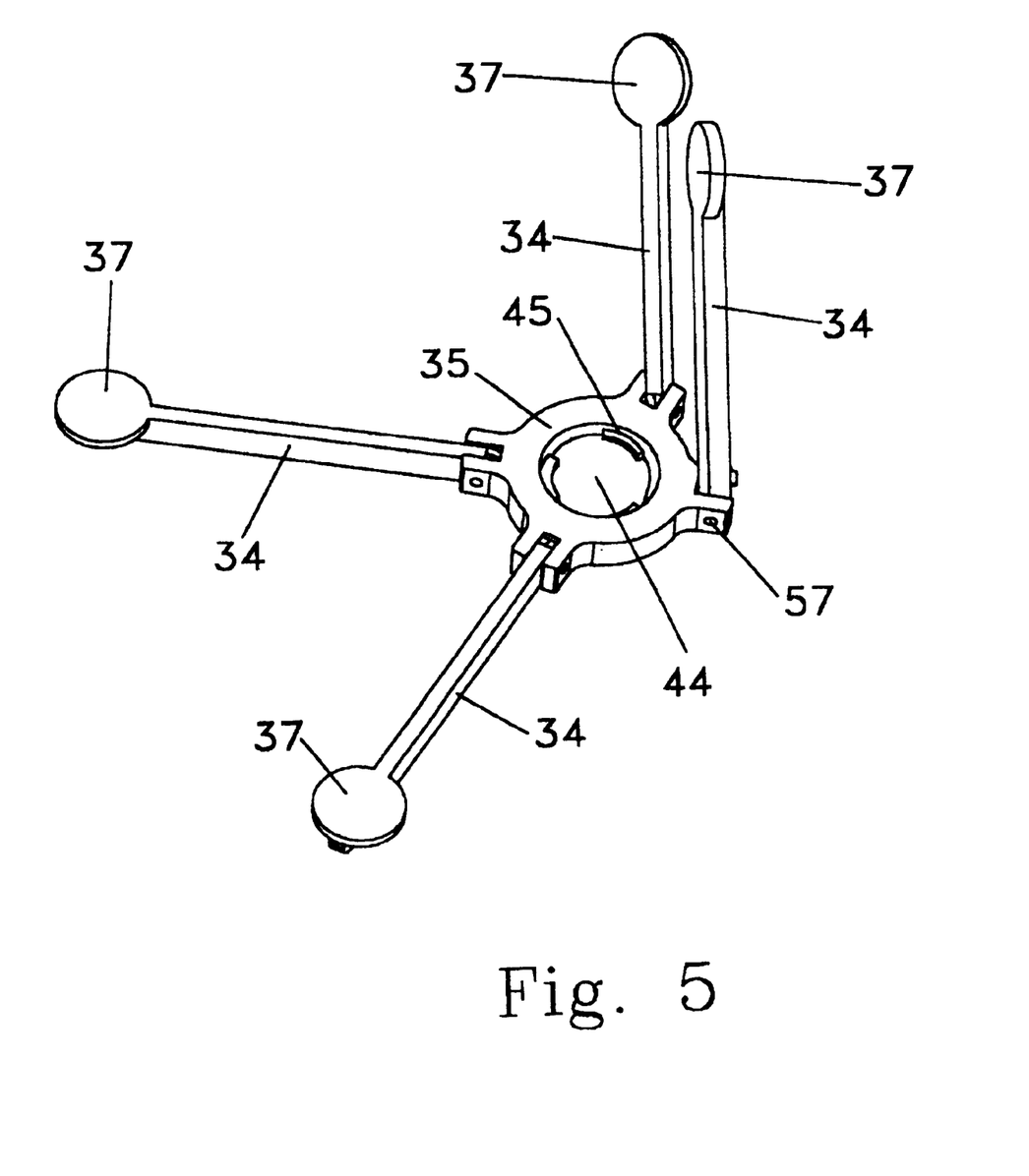
FIG. 5 is a perspective view of the spider assembly with two arms folded.

The elongated bar portion forming the main body of each of the support arms 34 has at its inner end a pair of parallel outwardly facing side surfaces where the inner arm end is carried by a hinge pin 57 extending between a pair of outwardly extending parallel integrally formed ears 60 on the spider hub 35 the arms 34 are swung down and out from a folded configuration for storage, as shown in FIG. 5, to their positions of use, their free ends extend from the hub 35 into proximity with the four corners of a rectangle corresponding to the usually optimum corner supporting points on the bottom of the keyboard device 11. The coplanar mini-platforms 37 on the free ends of the arms 34 preferably support the corners of the keyboard device 11 to keep the bottom central area of the keyboard device 11 slightly spaced from the centrally located spider hub 35 to reduce transfer of shocks from the tripod 12 to central areas of the bottom of the device 11. Slight resiliency of the arms 34 further reduces transfer of shocks from the tripod legs to the device 11. When the platform 30 is detached from the tripod head 20 the arms 34 may be swung upwardly approximately 90° relative to the spider hub 35 to a compact configuration for carrying or storage in which the arms are parallel to each other. Each arm 34 is prevented from swinging downwardly beyond its extended generally horizontal position of use by means of a downwardly and inwardly inclined flat end face 58 of the arm 34 which swings up to abut a complementary undercut surface 59 facing downwardly and outwardly at the inner end of the space between the ears 60 which carry the ends of the hinge pin 57 for the respective support arm 34. When the platform is attached to the tripod head 20 the extended arms 34 are also supported against downward movement of their outer ends by engagement with the canted tripod head surface 21 and the canted surface 21 prevents upward movement of the arms 34 by engaging the inner bottom surfaces of the arms under the inclined flat end faces 58 of the arms 34 to provide means whereby the arms 34 are interlocked with the hub 35 and the tripod head 20 to retain the arms in their extended coplanar positions. In lieu of the detachable spider assembly, a similar result may be accomplished by integrating into the lower side of the case of the computer "keyboard device" a bayonet connector such as that used in the spider hub to provide securement means for releasably connecting the keyboard device to any tripod or other stable structure in any of a variety of portable, mobile or static situations where a keyboard device is used. Such securement means includes a bayonet type quick release connection and also fixes the angle of tilt or cant of the keyboard device from the horizontal and relative to the stable structure, with the cant being adapted to be to be selectively positioned toward the user of the keyboard device. Any other suitable pivotable connection between the folding arms 34 and the hub 35 may be used to enable folding of the arms to a compact configuration and unfolding to a coplanar extended position using rigidly positioning retaining means for securement to the keyboard device.

The portable stand 10 is intended primarily for use by a seated user of the keyboard device 11. The lower edge of the canted head surface 21 is oriented toward the user and one leg 15 is preferably hinged to the side of the head 20 nearest the user with that leg 15 extending between the feet of the seated user to minimize interference between the leg 15 and the user's feet. The vertical plane of leg 15 bisects the angle formed between the two spider arms 34 closest to the user. The other two tripod legs 16 and 17 are equally spaced around the vertical axis of the erected tripod 12.

Referring to FIG. 2, each of the tripod legs 15–17 has an upper main leg member 61 with one or more telescoping elements 62 extendable from its lower end for leg length adjustment. A known type of cam lock 63 for each extendable element 62 and operable about a pivot axis parallel to the leg is manipulated by thumb and forefinger of a hand of the seated user to lock each extension in a selected position. The upper end of each upper main leg member 61 is hinged to the head 20 by a horizontal pin 65 extending across a recess between two depending wall portions 66 of the head 20. The lower ends of the upper main leg members 61 are interconnected to fix or limit their hinged movement outwardly from the vertical tripod axis by means of a three-arm support structure 70 in which the inner end of each arm 71 is hinged to a central yoke member 73 by a horizontal pin 75. The outer end of each arm 71 is similarly hinged by a pin extending through a projection 77 on the inside of the lower end of the respective main leg member 61. It is desirable, at each hinged intersection of an arm member 71 with a portion of the yoke member 73, to have one of these members overlie the other member to limit downward movement of the hinging point so that the flat upper surfaces of the three arms 71 and the yoke 73 are kept coplanar and form a centrally positioned auxiliary platform 80 for support of many accessories useful to the user of the keyboard device 11. In the case of a computer common accessory devices would include external computer peripheral devices such as hard disk drives, CD-ROM drives, tape drives, modems, or battery packs. By having any such device located near the central vertical axis of the tripod the stability of the tripod is not compromised and the projected horizontal footprint of the entire assembly need not be increased. This may be particularly beneficial where such space is limited, for example, when the user is seated in an airliner. Alternatively, a removable rigid accessory supporting platform 83 for a peripheral device 81 as shown in FIG. 3 may be supported at the outer ends of the arms 71.

Although the yoke 73 cannot be moved in the downward direction from its position coplanar with arms 71, the yoke is free to be manually moved upwardly in the opposite direction to cause the arms 71 to draw the tripod legs 15–17 inwardly to a retracted position in which all the legs 15–17 and the arms 71 are parallel in closely folded proximity. When the spider-like platform 30 is detached from the tripod head 20 and its arms 34 folded to be parallel, the free ends of the arms 34 may be intermeshed with the lower ends of the folded parallel tripod legs 15–17 to reduce the combined lengths of the folded tripod 12 and folded platform 30 to enable these combined essentially coaxial folded structures to be stored or carried in a compact tubular open-ended or open-sided pouch or like container. The container may have suitable means for releasably attaching it to luggage of a size commonly used to carry notebook computers or other small keyboard devices.

Since accessory devices such as wrist supports and mice or similar cursor controls are frequently used with computer keyboards and each may bear some of the user's arm weight, such accessory devices may be used with the present tripod support 10 without transferring such weight to the keyboard device by providing supporting means in front of the keyboard with the weight taken vertically by a supporting member 82 extending vertically directly downwardly and rearwardly to the front tripod leg 15 with an easily detachable connection device 84 fixed to the lower end of the supporting member 82 to immovably grasp the upper main portion 61 of this leg 15 when weight or downward force is applied to the upper end of the support member. The main leg portion 61 has a generally rectangular cross section. The connection device 84 has an upper rectangular hook member 86 with a free end extending rearwardly along one side of the leg portion 61 around the back of and at least partially to the other side of the leg portion 61. A lower rectangular hook member 88 of the device 84 similarly has a free end which extends rearwardly along the opposite side of the leg portion 61 at least partially in the opposite direction around the back of the leg portion 61. Device 84 and the hook members 86 and 88 have rubberized non-slip coatings so that they do not slide freely on the surface of the leg portion 61. The weight or downward force on the upper end of the support member transfers couple forces to the hooks to increase their grasping force on leg portion 61.

One accessory attachable by any suitable securing means to the upper end of the support member 82 is a rigid horizontal plate-like support platform 92 carrying a removable and adjustable elongated wrist support 93 extending along the front of the keyboard for supporting the user's wrist during keyboard manipulation. The support 92 may be adjustably positioned or removed to provide a mousepad area on the upper surface of platform 92. The plate structure 92 extends along the length of the keyboard and extends a sufficient distance therefrom to accommodate a mouse thereon as well as a wrist pad 93 slidably fastened at its ends to the plate structure and extending the length of the plate structure 92 parallel to the front of the keyboard. The pad 93 is slidable between a first position (shown in dotted lines in FIG. 3) where it provides wrist support during keyboard manipulation and a second position (shown in solid lines in FIG. 3), away from but parallel to the keyboard, in which wrist support is provided during mouse manipulation by the user on the mousepad between the wrist pad 93 and the keyboard.

By manually moving the upper end of the support member upwardly and rearwardly away from the user, the hooks can be sufficiently released to permit their adjustment along the leg portion 61. Twisting movement of the upper end, counterclockwise as seen from the front of the tripod, enables the hooks to be completely detached for removal of the connecting device from the leg portion 61.

If necessary to increase the stability of the accessory devices attached to the upper end of the support member 82, the upper end of the supporting member 82 or the accessory devices supported thereby may be guided against horizontal or swinging movement by tying connections extending with appropriate connecting means from the supporting member 82 or the accessory devices to the front of the keyboard device 11 or to the ends of the front two support arms 34 of the spider-like platform 30.

The bottom ends of the tripod legs 15–17 may be selectively provided with different non-slip feet appropriate for different smooth, carpeted or other floor surfaces.

For convenience, when space permits, one or more adjunct tripod support stands 10 may be used for related printing, facsimile, scanning or other external non-keyboard devices with the tripod head having an upper horizontal support platform in lieu of the canted surface 21. The stand may also have a flat panel secured to the arms 34 in lieu of an electronic device for use as a small temporary work table for supporting writing materials or documents having information being used as computer input data. Accessory devices such as power packs may be attached to the main leg portions by hook-and-loop fasteners and suitable straps.

The invention also contemplates the use of a spider-like platform for supporting a keyboard device on any stable structure in any of a variety of portable, mobile or static situations where a keyboard device is used. In any of the embodiments of this invention the arms and their supporting hub may be molded of a low cost, lightweight, tough, strong plastic material.

Other variations within the scope of this invention will be apparent from the described embodiment and it is intended that the present descriptions be illustrative of the inventive features encompassed by the appended claims.

What is claimed is:

1. A portable adjustable-height folding tripod support for a keyboard device for a seated user of the device, the tripod support comprising a spider-like platform with a plurality of cantilevered divergent support arms having outwardly extending end portions providing coplanar support surfaces, said platform including fastener means on outer ends of the support arms for releasably securing said support arms to the keyboard device, said tripod support including a tripod having three legs, each leg having an upper main leg member and at least another adjustable telescoping member for leg length adjustment, said tripod having a head and hinge means for connecting said head to the upper ends of the upper main leg members, said head having an upper surface canted at a fixed angle from horizontal when the tripod is on a horizontal surface and its legs are of equal lengths, said canted surface being adapted to be canted in a direction toward the user by selective positioning of the tripod relative to the user, said tripod support including means for releasably connecting said platform to the canted surface of the tripod head whereby the platform assumes said canted angle to provide an ergonomically improved angle of operation for a keyboard of a keyboard device supported on the platform.

2. A portable adjustable-height folding tripod support for a keyboard device according to claim 1 wherein said tripod legs are foldable between outer unfolded support positions and folded stored positions, said tripod including means connected to the tripod legs to fix the position of their outward unfolding movement and including a foldable support structure with three support arms having outer ends of the three support arms hinged to the lower ends of respective main leg members, said foldable support structure including a yoke member interconnecting only the three support arms and hinged to the inner ends of the three support arms, said yoke member being manually moveable toward said head to draw the tripod legs together in a folded configuration.

3. A portable adjustable-height folding tripod support for a keyboard device according to claim 1 wherein said spider-like platform has a hub from which said cantilevered arms extend, and wherein said means for releasably connecting said platform to said tripod head comprises a manual quick-release connection means between the hub and the head whereby turning the hub a small fraction of a revolution in opposite directions relative to the head provides for connection to and for release from the head.

4. A portable adjustable-height folding tripod support for a keyboard device according to claim 3 wherein the quick-release connection is a bayonet type connection.

5. A portable adjustable-height folding tripod support for a keyboard device according to claim 1 wherein said spider-like platform has a hub with means supporting said divergent cantilevered arms in a device-supporting configuration and for supporting the cantilevered arms in folded positions relative to said hub in a compact configuration, said hub having a manual quick-release connection to the head.

6. A portable adjustable-height folding tripod support for a keyboard device according to claim 5 wherein said cantilevered arms fold to parallel positions.

7. A portable adjustable-height folding tripod support for a keyboard device according to claim 1 wherein said support arms provide a slightly dished platform configuration relative to said coplanar support surfaces to provide most of the support for the device to outer corners of the device at said coplanar support surfaces.

8. A portable adjustable-height folding tripod support for a keyboard device according to claim 1 wherein each support arm has an enlarged upper flat support surface area at its outer end for attachment thereto of one part of a hook-and-loop fastener for connection to another part of such a fastener attached to the keyboard device.

9. A portable adjustable-height folding tripod support for a keyboard device according to claim 1 wherein one leg of the tripod extends in the same direction in which the upper surface of the head is canted toward the user for positioning between the user's feet.

10. A portable adjustable-height folding tripod support for a keyboard device according to claim 9 including a further support structure with a support member extending from said one leg to a position near the front of the keyboard device for supporting an accessory device, and means for removably and adjustably securely connecting said support structure to said one leg.

11. A portable adjustable-height folding tripod support for a keyboard device according to claim 10 and including as said accessory device a support pad along the front of the keyboard device for supporting the user's wrist during operation of the keyboard device.

12. A portable adjustable-height folding tripod support for a keyboard device according to claim 10 and including as said accessory device a small platform for a computer cursor moving device.

13. A portable adjustable-height folding tripod support for a keyboard device according to claim 2 wherein when said tripod legs are unfolded, said three support arms and said yoke have upper flat surfaces in a common plane and providing a knee-height platform for user accessories.

14. A portable adjustable-height folding tripod support according to claim 1 wherein said platform includes feet on the under side of the ends of the divergent support arms to support the platform on a flat surface when the platform is removed from the tripod with the device still intact on the platform.

15. A portable adjustable-height folding tripod support according to claim 1 wherein said platform is about one half inch high, enabling the platform to remain attached to the device when the device and platform are removed intact from the tripod and placed in a briefcase.

16. A portable adjustable-height folding tripod support for a keyboard device for a seated user of the device,
the support comprising a spider-like platform with foldable support arms having relatively folded compact storage and unfolded coplanar support positions with said support arms when unfolded having upper flat coplanar surfaces at their outer ends for attachment to a flat underside of the keyboard device,
said platform including fastener means on said flat coplanar surfaces for releasably securing said support arms to a flat underside of the keyboard device,
said tripod support including a tripod having three legs, each leg having an upper main leg member and at least another adjustable telescoping member for leg length adjustment,
said tripod having a head and means for pivotably connecting said head to the upper ends of the upper main leg members to enable folding said tripod legs between outer unfolded support positions and folded stored positions,
means for releasably connecting said platform to the tripod head,
said tripod including means connected to the tripod legs to fix their outer unfolded positions and including a foldable three-arm support structure having outer ends of the three-arm support structure pivotably connected to the lower ends of respective main leg members,
said three-arm support structure including a flat yoke member pivotably interconnecting the inner ends of the three support arms,
said support arms and said yoke member having upper flat surfaces in a common plane and providing a knee-height platform for user accessories when the tripod legs are unfolded.

17. A portable adjustable-height folding tripod support according to claim 16 wherein said platform includes feet on the under side of the ends of the foldable platform support arms to support the platform on a flat surface when the platform is removed from the tripod with the device still intact with and secured to the platform,
said platform being about one half inch high, enabling the platform to remain attached and secured to the device when the device and platform are removed intact from the tripod and placed in a briefcase.

18. A portable adjustable-height folding tripod support according to claim 16 including means interconnecting the yoke member and said three-arm support structure to prevent downward movement of the yoke member relative to said common plane, but permitting upward yoke member movement enabling the three-arm support structure to be folded upwardly and the tripod legs to be folded inwardly with the three-arm support structure and tripod legs all folded to parallel positions.

19. A portable adjustable-height folding tripod support for a keyboard device for a seated user of the device,
said tripod support for the keyboard device including a tripod having three legs, each leg having an upper main leg member and at least another adjustable telescoping member for leg length adjustment,
said tripod having a head, and hinge means for connecting said head to the upper ends of the upper main leg members,
said head having an upper surface,
said tripod support including securement means for releasably connecting a keyboard device to the upper surface of said head whereby the keyboard device is canted at a fixed angle from horizontal when the tripod legs are of equal lengths and resting on a horizontal surface whereby the cant of the keyboard device is adapted to be canted in a direction toward the user by selective positioning of the tripod relative to the user to provide an ergonomically improved angle of operation for the keyboard of a keyboard device supported on the tripod support.

20. A portable adjustable-height folding tripod support for a keyboard device according to claim 19 wherein the keyboard device securement means comprises a quick-release bayonet type connection.

21. A portable support for attachment of a keyboard device having a flat underside to a stable structure, the portable support comprising a spider-like platform having a hub with a plurality of foldable cantilevered support arms extending relative to the hub and movable between relatively folded storage positions and unfolded generally coplanar hub-supported device-supporting positions, each arm having an elongated integrally formed bar forming the body of the arm and having at its inner end a pair of parallel outwardly facing side surfaces where the inner arm end extends and is pivotably supported between a pair of outwardly extending parallel opposed faces on integrally formed portions of the spider hub, the inner end of each bar having in its unfolded position of use a downwardly and inwardly extending end surface abutting an outwardly and downwardly facing surface of the hub to prevent the respective arms from swinging downwardly beyond their extended generally coplanar positions of use, said support arms when unfolded for use having integrally formed portions defining free upper upwardly-unobstructed flat coplanar surfaces at the outer ends of the bars for attachment to a flat underside of the keyboard device, said platform including fastener means on the flat coplanar surfaces on the ends of the unfolded support arms for releasably securing said support arms to a flat underside of a keyboard device, and said platform including quick release connection means for releasably securing said platform hub to a stable structure, said quick release connection means including means having cooperating members on the platform hub and the stable structure to retain the hub in a secure position on the stable structure, said quick release connection means being operable between secure and release positions of the platform by a small relative movement of the hub relative to the stable structure.

22. A portable support according to claim 21 wherein said hub and said arms are made of low cost, lightweight and tough plastic.

23. A portable support according to claim 21 comprising four such support arms which are cantilevered from the hub when unfolded and which fold to parallel storage positions, said quick release connection means including detent means having cooperating members on the platform hub and the stable structure to releasably engage the hub in a secure position on the stable structure, said quick release connection means being operable between secure and release positions of the platform by a small fraction of a revolution of relative movement of the hub relative to the stable structure, said detent means being operable during a portion of said small relative movement of the hub relative to the stable structure.

24. A portable support according to claim 23 wherein said fastener means comprises on the upper flat surface of each arm one part of a hook and loop fastener for engagement with a mating part of such fastener on the keyboard device.

25. A portable support according to claim 1 wherein the tripod support includes locking means to prevent movement of said cantilevered platform arms relative to said platform hub when the platform is secured to the tripod head.

26. A portable support according to claim 25 wherein the tripod support includes surfaces on said tripod head and on said platform hub which are engaged by surfaces on said platform arms to provide locking means to prevent movement of said cantilevered platform arms relative to said platform hub when the platform is secured to the tripod head.

* * * * *